US009246618B2

(12) United States Patent
Jain et al.

(10) Patent No.: US 9,246,618 B2
(45) Date of Patent: Jan. 26, 2016

(54) SELECTIVE JOINDER OF MACHINE-TYPE COMMUNICATION USER EQUIPMENT WITH WIRELESS CELL

(71) Applicant: Intel Corporation, Santa Clara, CA (US)

(72) Inventors: Puneet Jain, Hillsboro, OR (US); Sangeetha Bangolae, Beaverton, OR (US); Marta Martinez Tarradell, Hillsboro, OR (US); Mo-Han Fong, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/735,952

(22) Filed: Jan. 7, 2013

(65) Prior Publication Data
US 2013/0303166 A1 Nov. 14, 2013

Related U.S. Application Data

(60) Provisional application No. 61/646,223, filed on May 11, 2012.

(51) Int. Cl.
*H04W 4/00* (2009.01)
*H04W 36/22* (2009.01)
(Continued)

(52) U.S. Cl.
CPC ............ *H04J 3/1694* (2013.01); *H04B 1/56* (2013.01); *H04B 7/024* (2013.01); *H04B 7/0456* (2013.01);
(Continued)

(58) Field of Classification Search
CPC ..... H04W 24/02; H04W 4/005; H04W 4/006; H04W 12/06

USPC .......... 455/435.1–435.3, 436–444, 450, 509, 455/512–514; 370/331, 338
See application file for complete search history.

(56) References Cited

U.S. PATENT DOCUMENTS 8,854,960 B2    10/2014 Jain et al.
2005/0254474 A1* 11/2005 Iyer et al. ................. 370/338
(Continued)

FOREIGN PATENT DOCUMENTS

CN    101969635 A    2/2011
CN    102438277 A    5/2012
(Continued)

OTHER PUBLICATIONS

International Search Report and Written Opinion for International App. No. PCT/US2013/040007, mailed Jul. 26, 2013.

(Continued)

*Primary Examiner* — San Htun
*Assistant Examiner* — Erica Navar
(74) *Attorney, Agent, or Firm* — Schwabe, Williamson & Wyatt, P.C.

(57) ABSTRACT

Embodiments are described herein for selective joinder of wireless cells by machine-type communication ("MTC") user equipment ("UE"). An MTC UE may detect a plurality of wireless cells, each provided by an evolved Node B ("eNB"). The MTC UE may detect eNB categories associated with individual wireless cells of the plurality of wireless cells, and may identify one or more wireless cells of the plurality of detected wireless cells on which MTC traffic is permitted based on the associated eNB categories. The MTC UE may selectively join a wireless cell of the one or more identified wireless cells based on a cell selection criterion. Additionally, an eNB may provide a wireless cell and provide, to an MTC UE, an MTC policy that identifies a circumstance under which the eNB will permit MTC traffic. The eNB may be configured to selectively serve the MTC UE based on the MTC policy.

12 Claims, 7 Drawing Sheets

(51) Int. Cl.

| | |
|---|---|
| *H04J 3/16* | (2006.01) |
| *H04B 7/26* | (2006.01) |
| *H04W 36/00* | (2009.01) |
| *H04W 24/10* | (2009.01) |
| *H04W 72/04* | (2009.01) |
| *H04W 72/08* | (2009.01) |
| *H04J 3/00* | (2006.01) |
| *H04B 1/56* | (2006.01) |
| *H04W 56/00* | (2009.01) |
| *H04W 76/02* | (2009.01) |
| *H04W 4/22* | (2009.01) |
| *H04B 15/00* | (2006.01) |
| *H04W 76/04* | (2009.01) |
| *H04B 7/02* | (2006.01) |
| *H04B 7/04* | (2006.01) |
| *H04B 7/06* | (2006.01) |
| *H04W 24/02* | (2009.01) |
| *H04W 72/12* | (2009.01) |
| *H04L 29/02* | (2006.01) |
| *H04W 4/06* | (2009.01) |
| *H04W 48/20* | (2009.01) |
| *H04L 29/06* | (2006.01) |
| *H04W 4/02* | (2009.01) |
| *H04J 3/26* | (2006.01) |
| *H04L 27/26* | (2006.01) |
| *H04W 72/10* | (2009.01) |
| *H04L 5/00* | (2006.01) |
| *H04L 5/14* | (2006.01) |
| *H04W 36/30* | (2009.01) |
| *H04W 36/18* | (2009.01) |
| *H04W 52/02* | (2009.01) |
| *H04W 88/06* | (2009.01) |
| *H04W 72/02* | (2009.01) |
| *H04W 16/14* | (2009.01) |

(52) U.S. Cl.
CPC ............ *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 5/0096* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/0061* (2013.01); *H04W 36/22* (2013.01); *H04W 48/20* (2013.01); *H04W 52/0212* (2013.01); *H04W 52/0225* (2013.01); *H04W 52/0229* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/046* (2013.01); *H04W 76/048* (2013.01); *H04L 5/0073* (2013.01); *H04W 16/14* (2013.01); *H04W 36/18* (2013.01); *H04W 36/30* (2013.01); *H04W 52/0235* (2013.01); *H04W 72/02* (2013.01); *H04W 88/06* (2013.01); *Y02B 60/50* (2013.01)

(56) References Cited

U.S. PATENT DOCUMENTS

| | | | |
|---|---|---|---|
| 2007/0104148 A1* | 5/2007 | Kang et al. .................... | 370/331 |
| 2009/0086672 A1 | 4/2009 | Gholmieh et al. | |
| 2010/0029295 A1 | 2/2010 | Touboul et al. | |
| 2010/0057485 A1 | 3/2010 | Luft | |
| 2011/0235558 A1 | 9/2011 | Diachina et al. | |
| 2012/0040643 A1 | 2/2012 | Diachina et al. | |
| 2012/0083204 A1 | 4/2012 | Martin | |
| 2012/0088505 A1* | 4/2012 | Toh et al. ...................... | 455/434 |
| 2013/0201830 A1* | 8/2013 | Wang et al. ................... | 370/235 |

FOREIGN PATENT DOCUMENTS

| | | |
|---|---|---|
| CN | 102448144 A | 5/2012 |
| EP | 2369875 A1 | 9/2011 |
| KR | 20110083538 A | 7/2011 |
| TW | 201218803 A1 | 5/2012 |
| WO | 2011066409 A1 | 6/2011 |
| WO | WO 2011/100570 | 8/2011 |
| WO | 2011123755 A1 | 10/2011 |
| WO | WO 2011/149252 A2 | 12/2011 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304 V11.1.0, LTE Advanced, Sep. 21, 2012, 33 pages.

3GPP, "3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.1.0, LTE Advanced, Sep. 26, 2012, 325 pages.

Office Action issued Jun. 30, 2014 from Swedish Application No. 1350578-9.

Search Report issued Sep. 9, 2014 from Spanish Patent Application No. P201330679.

International Preliminary Report on Patentability mailed Nov. 20, 2014 from International Application No. PCT/US2013/040007.

Office Action mailed Dec. 8, 2014 from Finnish Patent Application No. 20135471.

Office Action mailed Dec. 12, 2014 from Taiwan Patent Application No. 102113971.

Search Report issued Feb. 10, 2015 from Dutch Application No. 2010738.

Office Action mailed Mar. 2, 2015 from Belgium Patent Application No. 2013/0322 (Google Translated).

Alcatel-Lucent, "MME Overload Control by Throttling of DL Low Priority Traffic," 3GPP TSG SA WG2 Meeting #81, 82-105057 (WAS 4574), Oct. 11-15, 2010.

Office Action issued May 19, 2015 from Spanish Patent Application No. P201330679.

Office Action mailed Jul. 15, 2015 from Taiwan Patent Application No. 102113971.

Office Action issued Oct. 6, 2015 from Japanese Patent Application No. 2015-509220.

* cited by examiner

SELECTIVE JOINDER OF MACHINE-TYPE COMMUNICATION USER EQUIPMENT WITH WIRELESS CELL

CROSS REFERENCE TO RELATED APPLICATIONS

This application claims priority under 35 U.S.C. §119(e) to U.S. Provisional Patent Application No. 61/646,223 entitled "ADVANCED WIRELESS COMMUNICATION SYSTEMS AND TECHNIQUES," filed May 11, 2012, the disclosure of which is incorporated herein by reference.

FIELD

Embodiments of the present invention relate generally to the technical field of data processing, and more particularly, to selective joinder of wireless cells by machine-type communication user equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Some user equipment ("UE") may be used primarily or exclusively for communication with other UE or computing devices, with little or no human intervention. Examples of such UE may include wireless weather sensors, assembly line sensors, meters to track vehicles of a fleet, and so forth. In many cases these devices may log onto a wireless network and communicate with a network server, e.g., over the Internet. In the parlance of the 3GPP Long Term Evolution ("LTE") Release 10 (March 2011) (the "LTE Standard"), such communications may be referred to as machine-type communication ("MTC"). In the parlance of the IEEE 802.16 standard, IEEE Std. 802.16-2009, published May 29, 2009 ("WiMAX"), such communications may be referred to as machine-to-machine ("M2M") communications.

UE that communicates primarily or exclusively with other computing devices or UE using MTC may generate very little user plane traffic. In many cases, that traffic may be treated as low priority. However, as the number of MTC UE increases, the overall volume of communications may nonetheless overload a network. Maintaining connection of such a large number of MTC UEs without impacting other (e.g., cell phone) traffic may be difficult.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
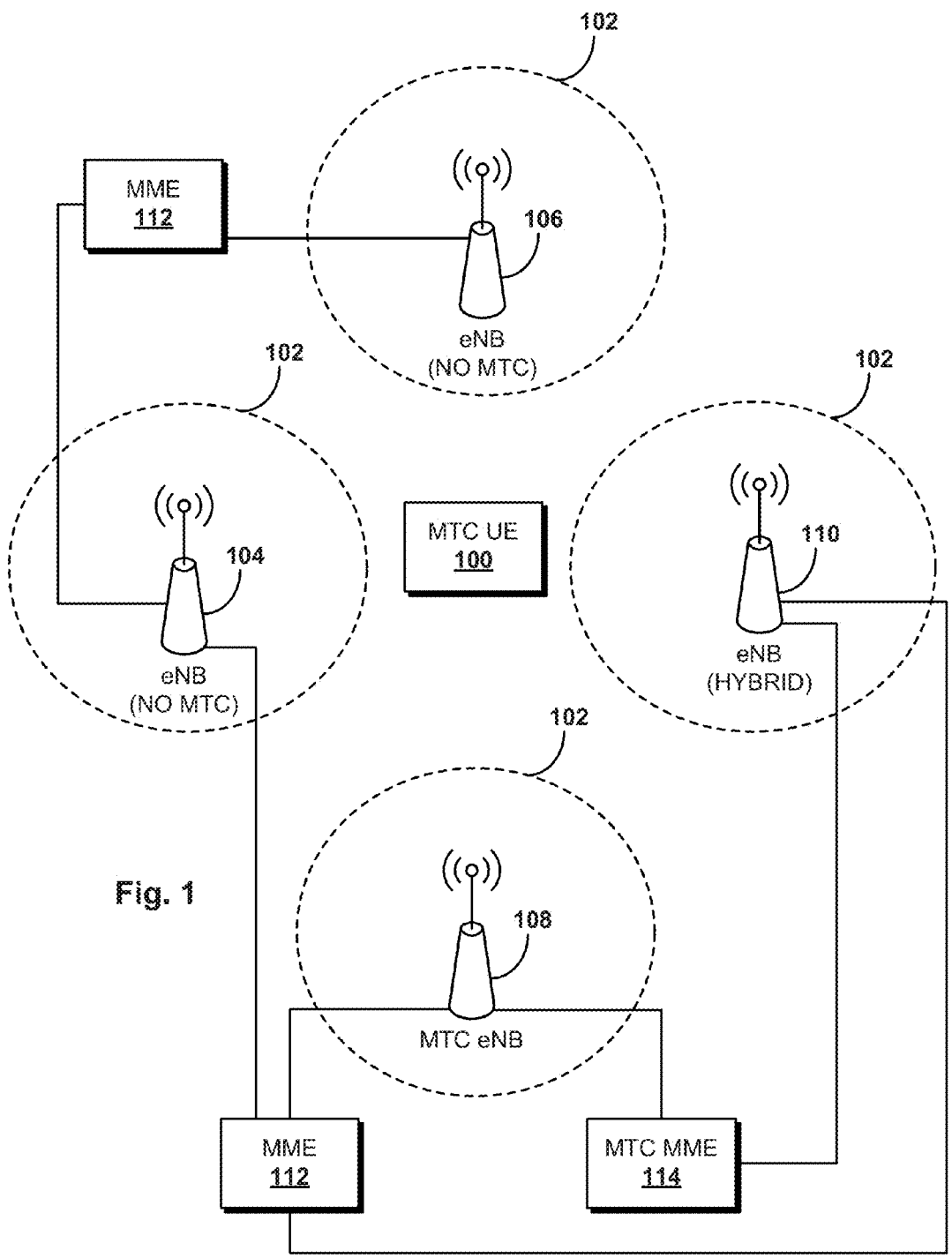
FIG. 1 schematically illustrates various network entities configured with applicable portions of the present disclosure to facilitate selective joinder of machine-type communication ("MTC") user equipment ("UE") with suitable wireless cells, in accordance with various embodiments of the present disclosure.

Entities that may facilitate selective joinder of wireless cells by a machine-type communication ("MTC") user equipment ("UE") are shown in FIG. 1. Although examples described herein make repeated reference to UE and other LTE-centric terminology, this is not meant to be limiting;

techniques described herein may be used in other wireless networks, such as GPS, EDGE, GPRS, CDMA, WiMAX, Ev-DO, and others.

MTC UE 100 may be configured to detect a plurality of wireless cells 102. In various embodiments, each wireless cell 102 may be provided by an evolved Node B ("eNB"). In various embodiments, MTC UE 100 may be configured to detect eNB categories associated with individual wireless cells 102 of the plurality of wireless cells 102. The term "eNB category" as used herein may denote a type of service provided or not provided by an eNB. For example, some eNBs, e.g., a first eNB 104 and a second eNB 106 in FIG. 1, may be configured to prohibit MTC traffic. An eNB may be configured in this way for a variety of reasons, such as to reserve the eNB's bandwidth for traffic considered higher priority than MTC traffic.

Some eNBs, such as a third eNB 108 in FIG. 1, may be provided to primarily or exclusively handle MTC traffic. This may preserve resources of "regular" eNBs such as first eNB 104 and second eNB 106 for other traffic. In various embodiments, an MTC-dedicated eNB may be a "low cost" eNB, e.g., for use in a factory or other environment having a large number of MTC UEs. This may reduce capital expenditure ("CAPEX") when rolling out new MTC services. In various embodiments, an MTC-dedicated eNB may broadcast an indication, e.g., as part of an MTC node ID, that it is dedicated to MTC traffic.

Yet other eNBs, such as a fourth eNB 110 in FIG. 1, may be configured to support "regular" (e.g., non-MTC) traffic, but to also support MTC traffic, either without qualification or under particular circumstances (examples of which will be described herein). Such an eNB 110 may be referred to herein as a "hybrid" eNB. In various embodiments, hybrid eNB 110 may broadcast an indication, e.g., as part of an MTC node ID, that it accepts MTC traffic under some or all circumstances.

Figure 2:
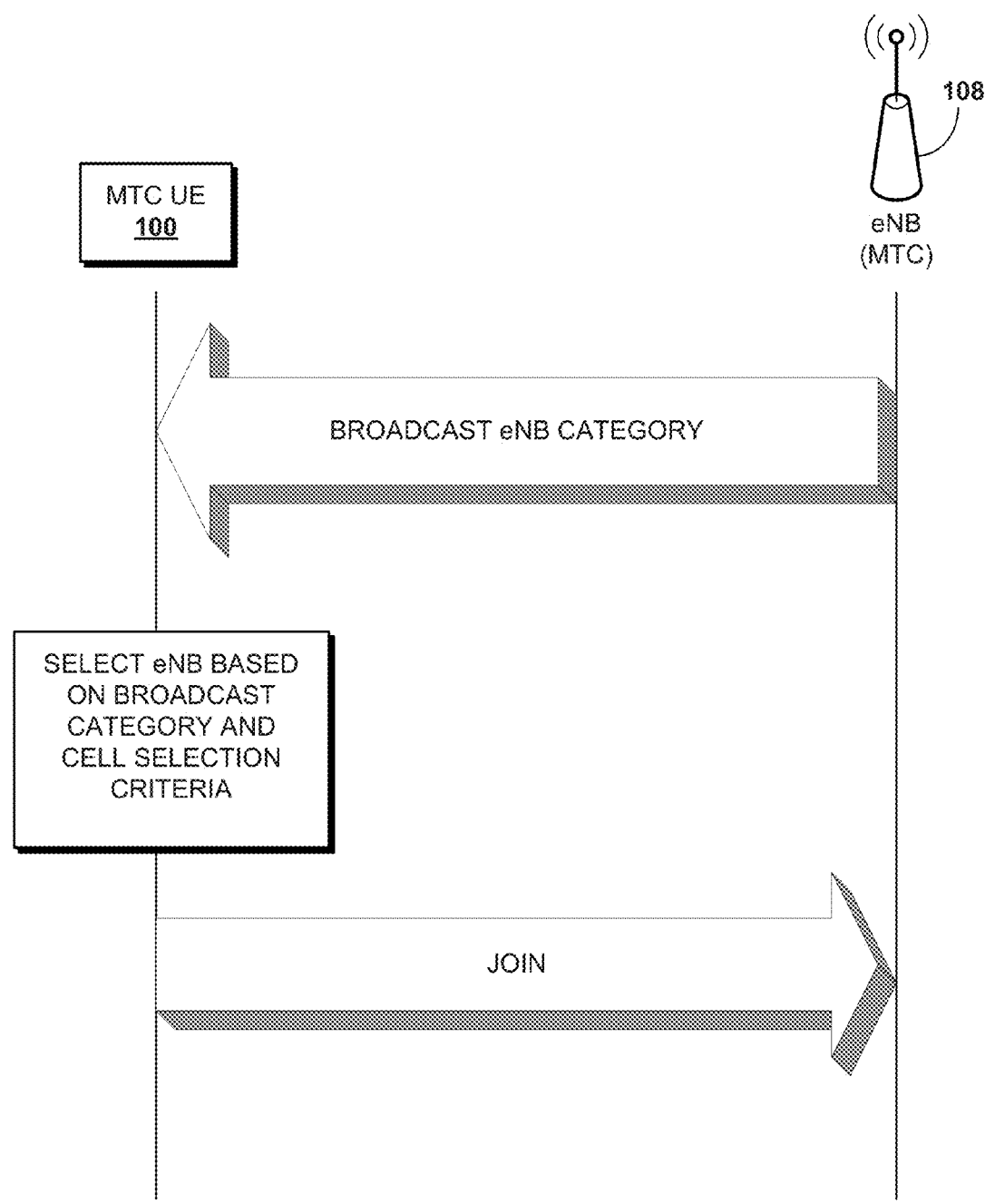
FIG. 2 depicts an example exchange of communications that may be implemented between an MTC UE and an evolved Node B ("eNB"), in accordance with various embodiments.

In various embodiments, eNBs may be configured to broadcast or otherwise make available their categories and other information usable to join cells they provide. In FIG. 2, for instance, MTC-dedicated eNB 108 is shown broadcasting its category (MTC-dedicated). MTC UE 100 may receive this broadcasted category, along with categories broadcast by other eNBs (e.g., 104, 106, 110, not shown in FIG. 2).

In various embodiments, upon detecting the plurality of wireless cells and their categories, MTC UE 100 may be configured to identify one or more wireless cells of the plurality of detected wireless cells 102 on which MTC traffic is permitted. In various embodiments, this identification may be based on the detected eNB categories associated with each wireless cell 102. In various embodiments, MTC UE 100 may be configured to cross check one or more of the identified wireless cells to a list of MTC-dedicated eNBs to which the MTC UE is permitted to connect. In various embodiments, the list of MTC-dedicated eNBs may be obtained from an eNB, e.g., using NAS signaling.

In various embodiments, a list of MTC-dedicated eNBs to which MTC UE 100 is permitted to connect may be maintained, e.g., by various entities in various locations. In some embodiments, the list may be maintained by MTC UE 100. Additionally or alternatively, the list may be maintained by network entities and made available via non-access stratum ("NAS") signaling. In various embodiments, the list may contain MTC-dedicated eNBs that belong to a particular public land mobile network ("PLMN") identity. For instance, the list may be a closed subscriber group ("CSG") whitelist. MTC UE 100 may select the most suitable detected cell that is also contained on this list, e.g., based on a cell selection criterion.

Once MTC UE 100 has matched identified wireless cells 102 of the detected cells to permitted MTC-dedicated cells on the list, in various embodiments, MTC UE 100 may selectively join one of the matching wireless cells 102, e.g., based on a cell selection criterion. An example of this is shown in FIG. 2. In various embodiments, after successful connection, MTC UE may be configured to store connection information to ease future connections and wireless cell selections.

Cell selection criteria may be usable, e.g., by MTC UE 100, to select from a plurality of candidate wireless cells, and may come in various forms. In various embodiments, a cell selection criterion may be a signal strength of the one or more identified wireless cells 102. For example, MTC UE 100 may determine that third eNB 108 has a stronger signal than a cell provided by another MTC-dedicated eNB (not shown), and may selectively join the wireless cell 102 provided by third eNB 108 on that basis. Other cell selection criteria may include but are not limited to available cell bandwidth, number of retries counter expiry, connection type, ping return time, available eNB resources, and so forth.

There may be situations in which no identified MTC-dedicated eNBs are on the list, or where no MTC-dedicated eNBs satisfy one or more cell selection criteria. In such cases, MTC UE 100 may identify the one or more wireless cells 102 on which both MTC and non-MTC traffic is permitted (e.g., as provided by hybrid eNB 110). For example, in FIG. 3, hybrid eNB 110 may provide, e.g., to MTC UE 100 individually or as part of a broadcast, an MTC policy that dictates circumstances under which MTC traffic is and is not permitted on a wireless cell 102 provided by hybrid eNB 110. Based on this policy and similar MTC policies associated with other hybrid eNBs, MTC UE may identify which of those hybrid eNBs, if any, that MTC UE 100 would be permitted to join given its current circumstances.

In various embodiments, the MTC policy may be provided by hybrid eNB 110 using dedicated UE signaling (e.g., NAS). In various embodiments, this MTC policy may be included in the broadcasted eNB category information depicted in FIG. 2. An MTC policy may be provided to MTC UEs in other ways as well. For example, in some embodiments, the Open Mobile Alliance Device Management ("OMA-DM") protocol may be used to configure MTC UE 100 with one or more MTC policies.

Figure 3:
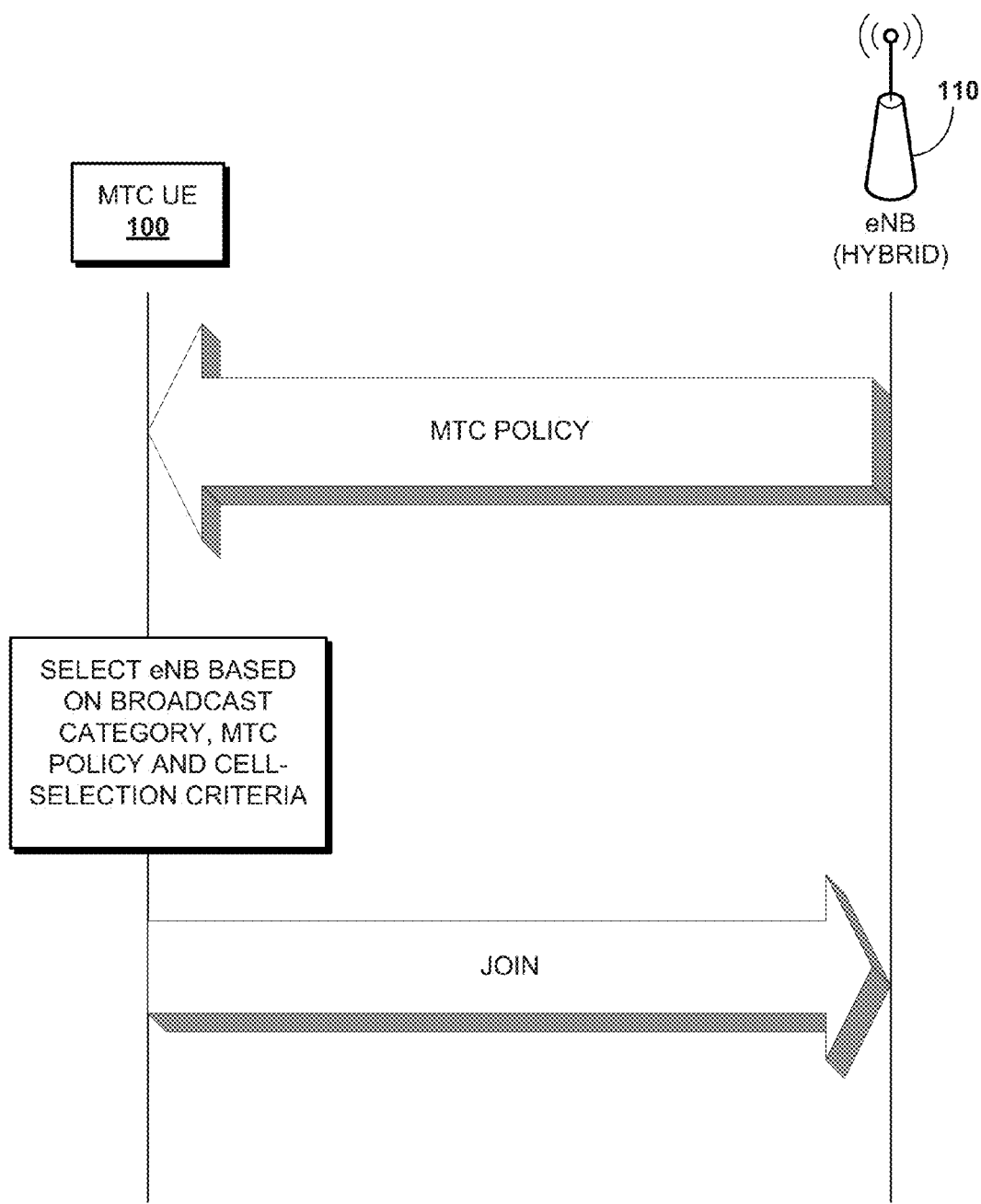
FIG. 3 depicts another example exchange of communications that may be implemented between an MTC UE and an eNB, in accordance with various embodiments.

The MTC policy may indicate circumstances under which MTC traffic is permitted on a wireless cell 102 provided by hybrid eNB 110. For example, MTC UEs at or near a particular location, e.g., within a geofence, may be served, whereas MTC UEs located at other locations may not be served. As another example, MTC UEs of a particular type may be served, whereas MTC UEs of another type may not. As shown in FIG. 3, MTC UE 100 may use this policy, in conjunction with various MTE UE attributes such as its location (e.g., based on global positioning system, or "GPS," coordinates) or type, to determine whether hybrid eNB 110 will permit MTC traffic to/from MTC UE 100 on the wireless cell 102. Then, MTC UE 100 may select and join a particular eNB based on cell selection criteria.

A UE may experience periods of downtime in which it does not transmit or receive communications. In some cases, such a UE may transition to an "idle" mode, e.g., to preserve power and/or computing or network resources. However, a UE may move around while in idle mode. In order to maintain a sufficient wireless connection, an idle "regular" UE (e.g., a cell phone) may, e.g., in accordance with Third Generation Partnership Project ("3GPP") Technical Specification ("TS") 36.304, periodically search for "permitted cells" to which it may connect in the event that the wireless cell that served it last is no longer the best option. For example, an idle UE may utilize a CSG whitelist that identifies cells to which the UE is permitted to connected (e.g., cells provided by a particular wireless carrier or belonging to a particular PLMN identity).

Similar to "regular" UEs, idle MTC UEs may periodically search for permitted cells that support or are provided by MTC-dedicated eNBs. If more than one permitted cell that is provided by an MTC-dedicated eNB is found, then the UE may rank the cells by cell selection criteria. If no permitted cells that are provided by MTC-dedicated eNBs are found (or satisfy the cell selection criteria), then the idle UE may transition to a "camp in any cell" state in which it searches more broadly for permitted cells (e.g., of a CSG) provided by hybrid eNBs that permit MTC traffic along with other traffic.

For example, in various embodiments, while in Radio Resource Control ("RRC") idle mode, MTC UE 100 may be configured to periodically detect another plurality of wireless cells 102, e.g., which may be different from a plurality of wireless cells 102 detected when MTC UE 100 last joined a wireless cell 102. Similar to when first joining a wireless cell 102, MTC UE 100 may be configured to detect eNB categories associated with individual wireless cells of the another plurality of wireless cells, and to identify one or more wireless cells of the another plurality of detected wireless cells on which MTC traffic is permitted based on the associated eNB categories. In various embodiments, MTC UE 100 may be configured to selectively initiate handoff from a wireless cell 102 to which the MTC UE is already joined to another wireless cell 102 of the one or more identified wireless cells based on a cell selection criterion.

Figure 4:
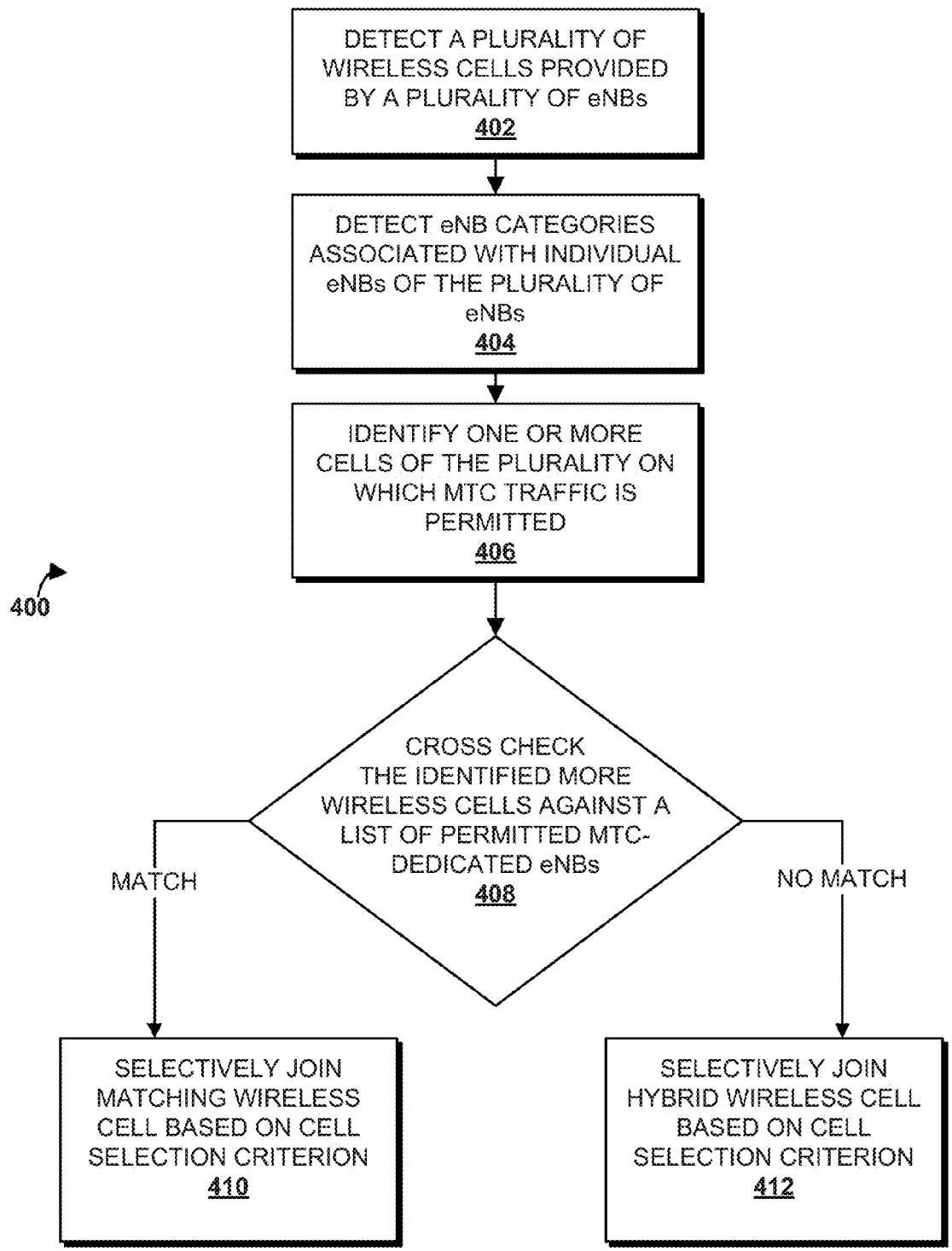
FIG. 4 depicts an example method that may be implemented by an MTC UE, in accordance with various embodiments.

Referring now to FIG. 4, an example method 400 is depicted that may be implemented by an MTC UE such as MTC UE 100 in FIG. 1, in accordance with various embodiments. At block 402, the MTC UE may detect a plurality of wireless cells (e.g., 102 in FIG. 1), each provided by an eNB (e.g., 104-110 in FIG. 1). At block 404, the MTC UE may detect eNB categories associated with individual wireless cells of the plurality of wireless cells.

At block 406, the MTC UE may identify one or more wireless cells of the plurality of detected wireless cells on which MTC traffic is permitted, e.g., based on the associated eNB categories. At block 408, the MTC UE may cross check the one or more identified wireless cells against a list of MTC-dedicated eNBs to which the MTC UE is permitted to connect (e.g., a CSG stored in memory of MTC UE 100 or maintained on the NAS). If, at block 408 one or more matching wireless cells is found, then at block 410 the MTC UE may selectively join the most suitable matching wireless cell provided by an MTC-dedicated eNB based on a cell selection criterion.

However, if at block 408, no matching wireless cells are found on the list, then at block 412, the MTC UE may selectively join a wireless cell provided by a hybrid eNB (e.g., 110 in FIG. 1) that permits both MTC and non-MTC traffic, e.g., based on cell selection criteria. In various embodiments, this selective joiner may be based on an MTC policy of the hybrid eNB that identifies a circumstance under which the hybrid eNB will permit MTC traffic. As noted above, a hybrid eNB may make the MTC policy available in various ways, such as via NAS signaling (in some cases with the eNB categories).

Figure 5:
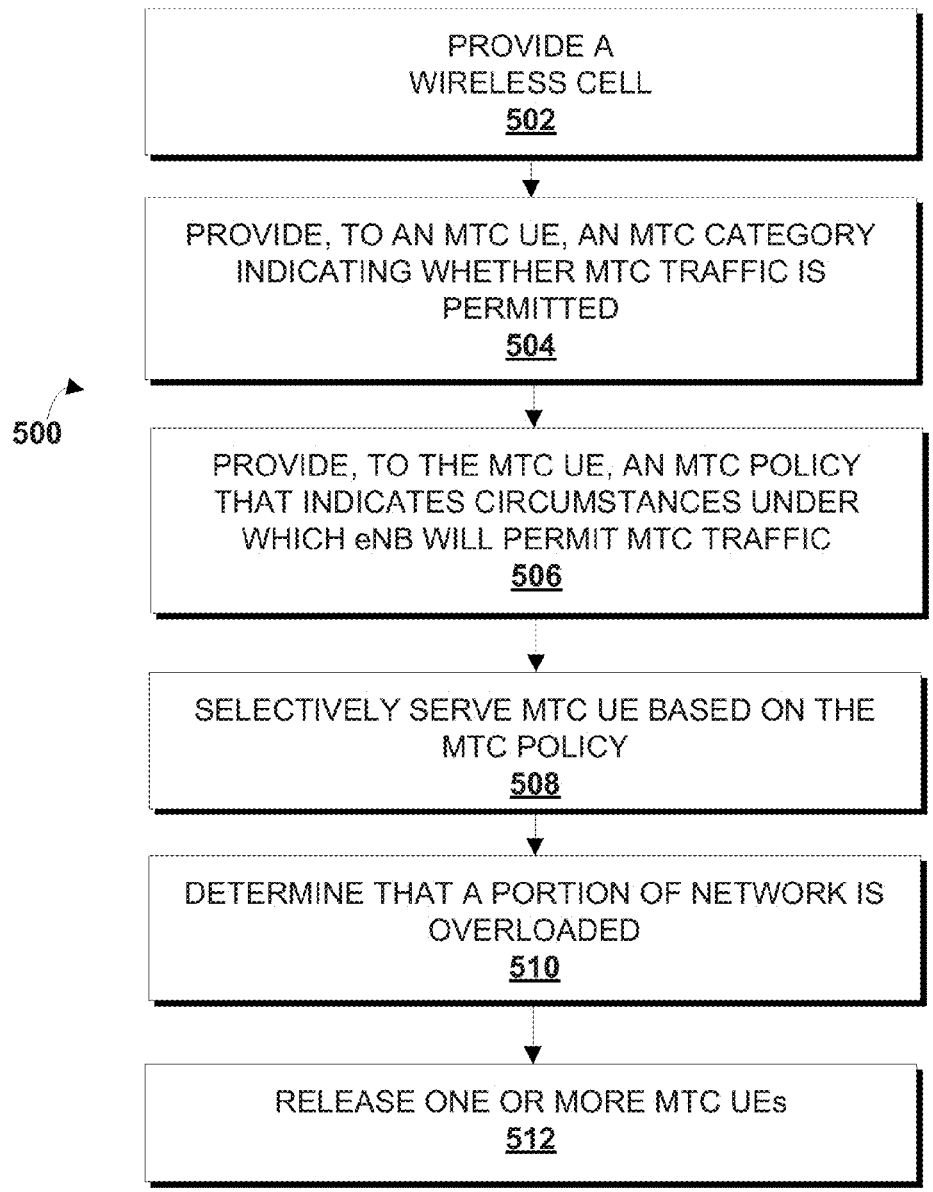
FIG. 5 depicts an example method that may be implemented by an eNB, in accordance with various embodiments.

Referring now to FIG. 5, an example method 500 is depicted that may be implemented by an eNB (e.g., 104-110), in accordance with various embodiments. Various operations of method 500 may be added or omitted depending on whether the eNB implemented method 500 is an MTC-dedicated eNB (e.g., 108), a hybrid eNB (e.g., 110) or an eNB that does not permit MTC traffic (e.g., 104, 106).

At block 502, the eNB may provide a wireless cell, such as one of the wireless cells 102 depicted in FIG. 1. At block 504, the eNB may provide, e.g., to MTC UE 100 (which may have detected the wireless cell 102 provided by the eNB), an MTC category indicating generally whether MTC traffic is permitted on the wireless cell provided by the eNB. If the eNB is a member an MTC category that prohibits MTC traffic (e.g., 104, 106), then MTC UE 100 may not communicate with the eNB further, and method 500 may end. If the eNB is an MTC-dedicated eNB (e.g., 108), then MTC UE 100 may join the wireless cell provided by the eNB, or another wireless cell provided by another MTC-dedicated eNB, based on cell selection criteria of the MTC UE 500.

If the eNB is a hybrid eNB (e.g., 110), at block 506, the eNB may provide, e.g., to MTC UE 100, an MTC policy that identifies a circumstance under which the eNB will permit MTC traffic. As noted above, the MTC policy may indicate that the eNB will serve MTC UEs that are located at or near a particular location, e.g., within a geofence, or that it will serve MTC UEs of a particular type. In various embodiments, the MTC category and/or the MTC policy may be provided to MTC UE 100 using NAS signaling. At block 508, the eNB may selectively serve MTC UE 100 based on the MTC policy.

In various embodiments, at block 510, the eNB may be configured to determine that a portion of a network to which the eNB is connected is overloaded. For example, the eNB may determine that its wireless cell is overloaded with network traffic, e.g., by virtue of its traffic density exceeding a predetermined threshold. In such case, at block 512, the eNB may be configured to release one or more MTC UEs, e.g., using an RRCConnectionRelease message with a specific RRC Release Indicator. In various embodiments, the RRC Release Indicator may cause the one or more MTC UEs to transition to a state in which the MTC UEs are disconnected from the network without re-registration. In various embodiments, the RRC Release Indicator may cause the one or more MTC UEs to transition to an idle mode. In various embodiments, the RRC Release Indicator may redirect the MTC UEs to another eNB.

In various embodiments, other components in a network besides eNBs may be dedicated to MTC communications, e.g., to contain MTC traffic and preserve network resources of non-MTC components for non-MTC traffic. One example entity that may come in MTC-dedicated form is a mobility management entity ("MME").

For example, in FIG. 1, there are two "regular" MMEs 112 that are not specifically dedicated to MTC traffic and one MTC-dedicated MME 114. MTC-dedicated eNB 108 and hybrid eNB 110 may be configured to select MTC-dedicated MME 114 for use when possible, but may also utilize non-MTC dedicated MME 112 if necessary (e.g., if MTC-dedicated MME 114 is down or overloaded). In various embodiments, similar to MTC-dedicated eNB 108, MTC-dedicated MME 114 may be a "low cost" MME, e.g., that might be set up in a factory or other environment having a large number of MTC UEs. This may further reduce CAPEX when rolling out new MTC services. It should be understood that the configuration of MMEs and eNBs shown in FIG. 1 is for illustration, and any other configuration or arrangement of MMEs and eNBs is contemplated.

Figure 6:
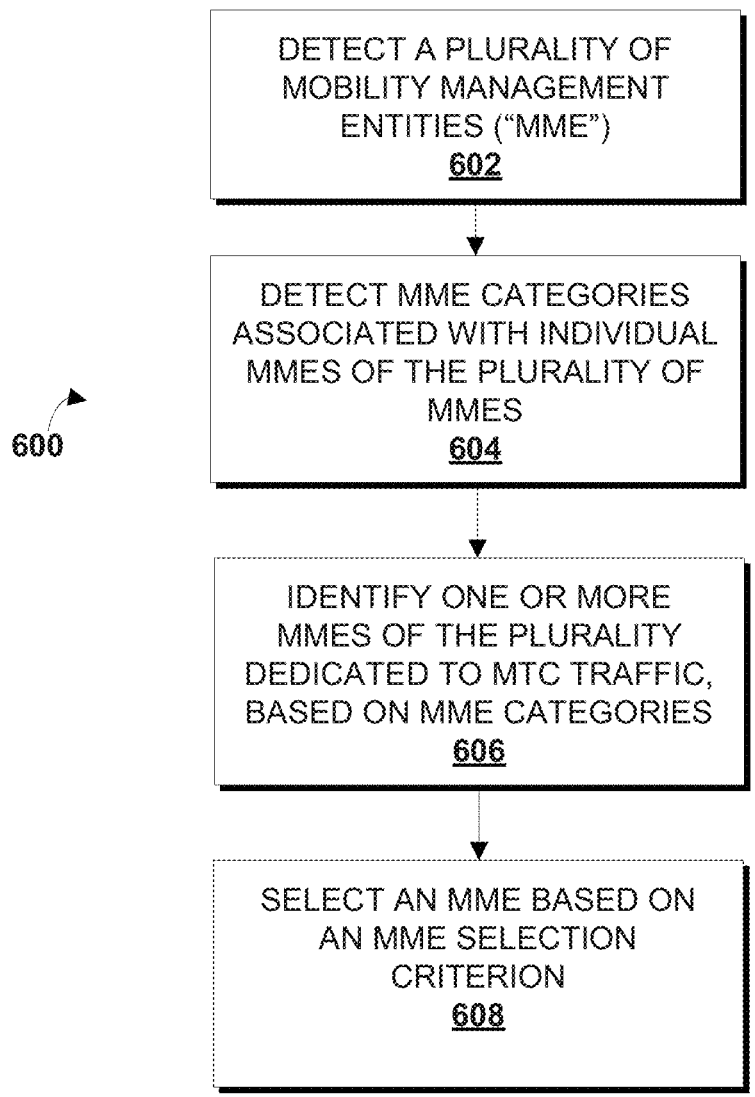
FIG. 6 depicts another example method that may be implemented by an eNB, in accordance with various embodiments.

FIG. 6 depicts an example method 600 that may be implemented by various eNBs, such as MTC-dedicated eNB 108 and hybrid eNB 110, to utilize an MTC-dedicated MME. At block 602, the eNB may detect a plurality of mobility management entities ("MME"). At block 604, the eNB may detect MME categories associated with individual MMEs of the plurality of MMEs. For example, the MMEs may provide their individual MME categories via an S1 interface.

At block 606, the eNB may identify one or more MMEs of the plurality of detected MMEs dedicated to MTC traffic based on the associated MME categories. For instance, hybrid eNB 110 in FIG. 1 may identify MTC-dedicated MME 114. At block 608, the eNB may select an MME of the one or more MMEs identified at block 606, based on an MME selection criterion. If there was only one MTC-MME identified at block 606, then the eNB may simply utilize that MME.

Figure 7:
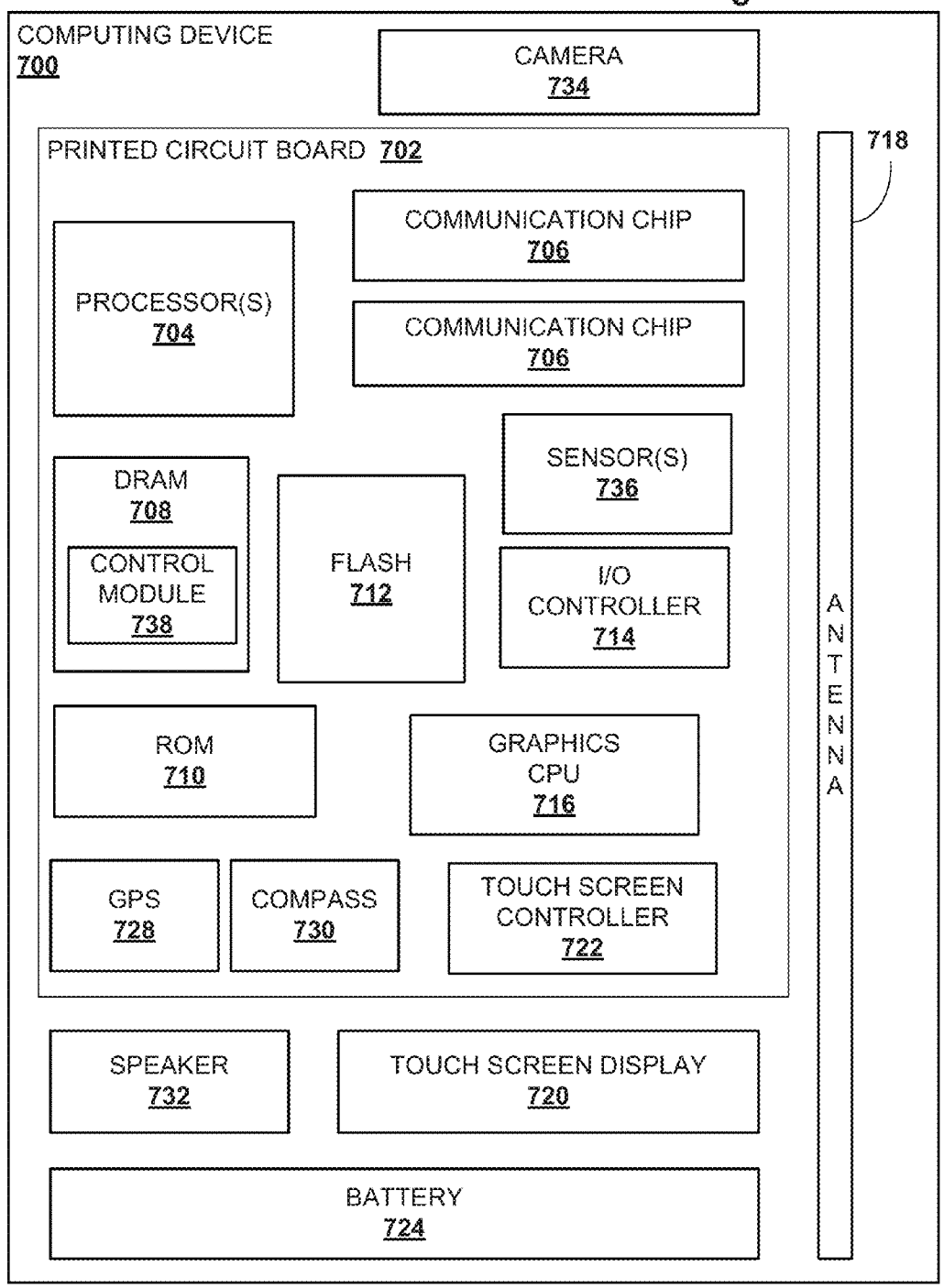
FIG. 7 schematically depicts an example computing device on which disclosed methods and computer-readable media may be implemented, in accordance with various embodiments.

FIG. 7 illustrates an example computing device 700, in accordance with various embodiments. MTC UE 100 or any of the eNBs (e.g., 104-110) described herein may be implemented on a computing device such as computing device 700. Computing device 700 may include a number of components, one or more processor(s) 704 and at least one communication chip 706. In various embodiments, the one or more processor(s) 704 each may be a processor core. In various embodiments, the at least one communication chip 706 may also be physically and electrically coupled to the one or more processors 704. In further implementations, the communication chip 706 may be part of the one or more processors 704. In various embodiments, computing device 700 may include printed circuit board ("PCB") 702. For these embodiments, the one or more processors 704 and communication chip 706 may be disposed thereon. In alternate embodiments, the various components may be coupled without the employment of PCB 702.

Depending on its applications, computing device 700 may include other components that may or may not be physically and electrically coupled to the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna 718, a display (not shown), a touch screen display 720, a touch screen controller 722, a battery 724, an audio codec (not shown), a video codec (not shown), a global positioning system ("GPS") device 728, a compass 730, an accelerometer (not shown), a gyroscope (not shown), a speaker 732, a camera 734, one or more other sensors 736 (e.g., a barometer, Geiger counter, thermometer, viscometers, rheometers, altimeters, or other sensors, e.g., as might be found in various manufacturing environments or used in other applications), or more a mass storage device (such as hard disk drive, a solid state drive, compact disk ("CD"), digital versatile disk ("DVD")) (not shown), and so forth. In various embodiments, the processor 704 may be integrated on the same die with other components to form a System on Chip ("SoC").

In various embodiments, volatile memory (e.g., DRAM 708), non-volatile memory (e.g., ROM 710), flash memory 712, and the mass storage device may include programming instructions configured to enable computing device 700, in response to execution by one or more processors 704, to practice all or selected aspects of the data exchanges depicted in FIGS. 2 and 3, or the methods 400, 500 or 600, depending on what computing device 700 is used to implement. More specifically, one or more of the memory components such as volatile memory (e.g., DRAM 708), non-volatile memory (e.g., ROM 710), flash memory 712, and the mass storage device may include temporal and/or persistent copies of instructions that, when executed, by one or more processors 704, enable computing device 700 to operate one or more modules 738 configured to practice all or selected aspects of the data exchanges depicted in FIG. 2 or 3, or methods 400, 500 or 600, depending on what computing device 700 is used to implement.

The communication chips 706 may enable wired and/or wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 700 may be any other electronic device that processes data.

Embodiments of apparatus, packages, computer-implemented methods, systems, devices, and computer-readable media (transitory and non-transitory) are described herein for selective joinder of wireless cells by MTC UE. In various embodiments, a plurality of wireless cells may be detected, each provided by an eNB. In various embodiments, eNB categories associated with individual wireless cells of the plurality of wireless cells may be detected. In various embodiments, one or more wireless cells of the plurality of detected wireless cells on which MTC traffic is permitted may be identified based on the associated eNB categories. In various embodiments, an MTC UE may selectively join a wireless cell of the one or more identified wireless cells based on a cell selection criterion.

In various embodiments, the MTC UE may obtain, e.g., from the eNB upon detection of a network overload, an instruction to transition from a connected mode to an idle or disconnected mode, and/release a connection to the eNB and redirect subsequent communications through another eNB.

In various embodiments, a list of MTC-dedicated eNBs to which the MTC UE is permitted to connect may be cross-checked against the identified wireless cells. In various embodiments, the MTC UE may selectively join the wireless cell further based on a result of the cross check. In various embodiments, the list of MTC-dedicated eNBs may be obtained from an eNB and/or via NAS signaling.

In various embodiments, a determination may be made that none of the MTC-dedicated eNBs on the list are able to serve the MTC UE. In various embodiments, an eNB that serves both MTC and non-MTC traffic may be identified, e.g., based on an MTC policy of the eNB that identifies a circumstance under which the eNB will permit MTC traffic. In various embodiments, the MTC policy may be provided by an eNB or configured on the MTC UE using an OMA-DM configuration. In various embodiments, the circumstance included in the MTC policy may include the MTC UE being at or near a predefined location, within a geofence or a particular type of MTC UE.

In various embodiments, the cell selection criterion may include a signal strength of the one or more identified wireless cells or expiration of a retries counter. In various embodiments, the MTC UE may be transitioned from a connected mode to an idle mode. In various embodiments, while in idle mode, the MTC UE may periodically detect another plurality of wireless cells, each provided by an eNB. In various embodiments, eNB categories associated with individual wireless cells of the another plurality of wireless cells may be detected. In various embodiments, one or more wireless cells of the another plurality of detected wireless cells on which MTC traffic is permitted may be identified based on the associated eNB categories. In various embodiments, handoff from the wireless cell to which the MTC UE previously selectively joined to another wireless cell of the one or more identified wireless cells of the another plurality of detected wireless cells may be selectively initiated based on the cell selection criterion.

In various embodiments, an eNB may be configured to provide a wireless cell. In various embodiments, the eNB may be configured to provide, to an MTC UE that detects the wireless cell, an MTC policy that identifies a circumstance under which the eNB will permit MTC traffic. In various embodiments, the eNB may be configured to selectively serve the MTC UE based on the MTC policy. In various embodiments, the eNB may be configured to provide the MTC policy to the MTC UE using dedicated UE signaling.

In various embodiments, the eNB may be configured to release the MTC UE responsive to a determination that a portion of a network to which the eNB is connected is overloaded. In various embodiments, the release may include transition of the MTC UE to an idle or disconnected mode, and/or redirection to a new eNB. In various embodiments, the portion of the network may be the wireless cell provided by the eNB.

In various embodiments, the eNB may be configured to detect a plurality of MMEs. In various embodiments, the eNB may be configured to detect MME categories associated with individual MMEs of the plurality of MMEs. In various embodiments, the eNB may be configured to identify one or more MMEs of the plurality of detected MMEs dedicated to MTC traffic based on the associated MME categories. In various embodiments, the eNB may be configured to select an MME of the one or more identified MMEs based on an MME selection criterion. In various embodiments, the MME categories may be detected over one or more S1 interface.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. Machine-type communication ("MTC") user equipment ("UE") comprising:
   one or more processors;
      memory coupled with the one or more processors; and
      at least one module, loaded into the memory and operated by the one or more processors, to:
   detect a plurality of wireless cells, each provided by an evolved Node B ("eNB");
   detect eNB categories associated with individual wireless cells of the plurality of wireless cells;
   identify one or more wireless cells of the plurality of detected wireless cells on which MTC traffic is permitted based on the associated eNB categories;
   cross check a list of MTC-dedicated eNBs to which the MTC UE is permitted to connect against the identified wireless cells;
   determine that none of the MTC-dedicated eNBs on the list are able to serve the MTC UE;
   identify an eNB that serves both MTC and non-MTC traffic, based on an MTC policy of the eNB that identifies a circumstance under which the eNB will permit MTC traffic;
   selectively join a wireless cell provided by the eNB that serves both MTC and non-MTC traffic based on the identification of the eNB that serves both MTC and non-MTC traffic; and
   transition the MTC UE from a connected mode to an idle mode, and while in idle mode:
      periodically detect another plurality of wireless cells, each provided by an eNB;
      detect eNB categories associated with individual wireless cells of the another plurality of wireless cells;
      identify one or more wireless cells of the another plurality of detected wireless cells on which MTC traffic is permitted based on the associate eNB categories; and
      selectively initiate handoff from the wireless cell to which the MTC UE previously selectively joined to another wireless cell of the one or more identified wireless cells of the another plurality of detected wireless cells based on a cell selection criterion.

2. The MTC UE of claim 1, wherein the processing circuitry is further to obtain the list of MTC-dedicated eNBs from an eNB.

3. The MTC UE of claim 1, wherein the processing circuitry is further to obtain the list of MTC-dedicated eNBs using non-access stratum ("NAS") signaling.

4. The MTC UE of claim 1, wherein the MTC policy is provided by an eNB or configured on the MTC UE using an Open Mobile Alliance Device Management ("OMA-DM") configuration.

5. The MTC UE of claim 1, wherein the circumstance comprises the MTC UE being at or near a predefined location, within a geofence or a particular type of MTC UE.

6. The MTC UE of claim 1, wherein the processing circuitry is further configured to obtain, from the eNB upon detection of a network overload, an instruction to transition from a connected mode to an idle mode or release a connection to the eNB and redirect subsequent communications through another eNB.

7. The MTCU UE of claim 1, wherein the cell selection criterion comprises a signal strength of the one or more identified wireless cells or expiration of a retries counter.

8. A non-transitory computer-readable medium comprising instructions that, in response to execution of the instructions by a machine-type communication ("MTC") user equipment ("UE"), enable the MTC UE to:
   identify evolved Node B ("eNB") categories associated with eNBs that provide individual wireless cells of a plurality of wireless cells;
   identify one or more wireless cells on which MTC traffic is permitted based on the eNB categories;
   cross check a list of MTC-dedicated eNBs to which the MTC UE is permitted to connect against the identified one or more wireless cells;
   determine that no MTC-dedicated eNBs on the list are able to serve the MTC UE;
   receive an MTC policy that identifies a circumstance under which one or more eNBs will permit both MTC traffic and non-MTC traffic;
   identify at least one eNB that serves both MTC and non-MTC traffic, based the MTC policy;
   select, from the plurality of wireless cells, a wireless cell provided by an eNB that permits both MTC traffic and non-MTC traffic for the MTC UE to join based on the identified MTC categories and the MTC policy; and
   transition the MTC UE from a connected mode to an idle mode, and while in idle mode:
      periodically detect another plurality of wireless cells, each provided by an eNB;
      detect eNB categories associated with individual wireless cells of the another plurality of wireless cells;
      identify one or more wireless cells of the another plurality of detected wireless cells on which MTC traffic is permitted based on the associated eNB categories; and
      selectively initiate handoff from the wireless cell to which the MTC UE previously selected to join to another wireless cell of the one or more identified wireless cells of the another plurality of detected wireless cells based on a cell selection criterion that is one of a signal strength of the one or more identified wireless cells or expiration of a retries counter.

9. The non-transitory computer-readable medium of claim 8, wherein the circumstance comprises the MTC UE being at or near a particular location.

10. The non-transitory computer-readable medium of claim 8, wherein the circumstance comprises the MTC UE being within a geofence.

11. The non-transitory computer-readable medium of claim 8, wherein the circumstance comprises the MTC UE being a particular type of UE.

12. The non-transitory computer-readable medium of claim 8, wherein the MTC categories or the MTC policy are obtained using non-access stratum ("NAS") signaling.

* * * * *